US011407006B2

(12) United States Patent
Tsubone et al.

(10) Patent No.: US 11,407,006 B2
(45) Date of Patent: Aug. 9, 2022

(54) AQUEOUS COATING COMPOSITION AND METHOD FOR FORMING METALLIC COATING FILM USING SAME

(71) Applicant: NIPPON PAINT AUTOMOTIVE COATINGS CO., LTD., Osaka (JP)

(72) Inventors: Ryohei Tsubone, Hirakata (JP); Shinichi Fujiwara, Hirakata (JP)

(73) Assignee: NIPPON PAINT AUTOMOTIVE COATINGS CO., LTD, Osaka (JP)

(*) Notice: Subject to any disclaimer, the term of this patent is extended or adjusted under 35 U.S.C. 154(b) by 113 days.

(21) Appl. No.: 16/310,116

(22) PCT Filed: Jun. 14, 2017

(86) PCT No.: PCT/JP2017/022010
§ 371 (c)(1),
(2) Date: Dec. 14, 2018

(87) PCT Pub. No.: WO2017/217471
PCT Pub. Date: Dec. 21, 2017

(65) Prior Publication Data
US 2019/0329291 A1  Oct. 31, 2019

(30) Foreign Application Priority Data

Jun. 15, 2016 (JP) .............................. JP2016-119107

(51) Int. Cl.
| C04B 14/00 | (2006.01) |
| B05D 5/06 | (2006.01) |
| B05D 7/24 | (2006.01) |
| B05D 7/00 | (2006.01) |
| C09D 5/02 | (2006.01) |
| C09D 5/03 | (2006.01) |
| C09D 5/36 | (2006.01) |
| C09D 133/00 | (2006.01) |
| C09D 167/00 | (2006.01) |
| C09D 175/04 | (2006.01) |
| C09D 201/00 | (2006.01) |
| C09C 1/00 | (2006.01) |

(52) U.S. Cl.
CPC .............. *B05D 5/067* (2013.01); *B05D 7/24* (2013.01); *B05D 7/53* (2013.01); *C09D 5/027* (2013.01); *C09D 5/037* (2013.01); *C09D 5/36* (2013.01); *C09D 133/00* (2013.01); *C09D 167/00* (2013.01); *C09D 175/04* (2013.01); *C09D 201/00* (2013.01); *B05D 2502/00* (2013.01); *B05D 2503/00* (2013.01); *B05D 2508/00* (2013.01); *B05D 2601/04* (2013.01); *B05D 2601/08* (2013.01); *B05D 2601/28* (2013.01)

(58) Field of Classification Search
USPC ................................ 106/400, 401, 415, 416
See application file for complete search history.

(56) References Cited

U.S. PATENT DOCUMENTS

| 6,001,915 | A | 12/1999 | Schwarte et al. |
| 6,632,915 | B1 | 10/2003 | Schwarte et al. |
| 2007/0269606 | A1 | 11/2007 | Schwarte et al. |
| 2010/0151139 | A1 | 6/2010 | Low et al. |
| 2011/0108426 | A1 | 5/2011 | Hayashi et al. |
| 2012/0107624 | A1* | 5/2012 | Klauth .................... C09K 11/02 264/21 |
| 2013/0143047 | A1* | 6/2013 | Schwarte .................. C09D 7/44 524/441 |
| 2014/0287257 | A1 | 9/2014 | Morishita et al. |
| 2015/0030869 | A1* | 1/2015 | Preston .................... C08L 21/02 524/425 |
| 2016/0222241 | A1* | 8/2016 | Campbell ................ C09D 7/70 |

FOREIGN PATENT DOCUMENTS

| CN | 103906578 | 7/2014 |
| DE | 40 09 858 | 10/1991 |
| DE | 44 37 535 | 4/1996 |

(Continued)

OTHER PUBLICATIONS

Notice of Reasons for Refusal dated Dec. 10, 2019 in corresponding Japanese Patent Application No. 2018-523976, with English Translation.

(Continued)

*Primary Examiner* — James E McDonough
(74) *Attorney, Agent, or Firm* — Wenderoth, Lind & Ponack, L.L.P.

(57) ABSTRACT

Provided is an aqueous coating composition capable of forming a coating film having superior metallic coating film appearance and coating film properties and reducing the amount of an organic solvent to be used. Also provided is a method for forming a metallic coating film using such an aqueous coating composition. Provided is an aqueous coating composition comprising a coating film-forming resin, a curing agent, a scaly pigment, an inorganic viscosity agent, a hydrophobic associative viscosity agent, and a dispersant, wherein the composition contains the inorganic viscosity agent in an amount of 1 to 7 parts by mass based on 100 parts by mass of the total resin solid content of the coating film-forming resin and the curing agent, and the composition contains the hydrophobic associative viscosity agent in an amount of 1 to 15 parts by mass based on 100 parts by mass of the total resin solid content of the coating film-forming resin and the curing agent.

11 Claims, No Drawings

(56) References Cited

FOREIGN PATENT DOCUMENTS

| | | |
|---|---|---|
| DE | 199 48 004 | 7/2001 |
| JP | 11-80620 | 3/1999 |
| JP | 2007-39616 | 2/2007 |
| JP | 2009-262001 | 11/2009 |
| JP | 2013-519772 | 5/2013 |
| WO | 2006/040284 | 4/2006 |

OTHER PUBLICATIONS

Extended European Search Report dated Feb. 14, 2020 in corresponding European Patent Application No. 17813366.6.
Office Action dated Apr. 15, 2020 in corresponding Chinese Patent Application No. 201780037416.2, with English translation.
International Search Report dated Sep. 5, 2017 in International Application No. PCT/JP2017/022010.
Notice of Reasons for Refusal dated Aug. 7, 2019 in corresponding Japanese Patent Application No. 2018-523976, with Machine translation.
International Preliminary Report on Patentability dated Dec. 27, 2018 in corresponding International (PCT) Application No. PCT/JP2017/022010.
Office Action dated Dec. 2, 2020 in corresponding Chinese Patent Application No. 201780037416.2, with English translation.
Examination Report dated Aug. 24, 2021 in corresponding European Patent Application No. 17813366.6.

\* cited by examiner

AQUEOUS COATING COMPOSITION AND METHOD FOR FORMING METALLIC COATING FILM USING SAME

TECHNICAL FIELD

The present invention relates to an aqueous coating composition and a method for forming a metallic coating film using the same.

BACKGROUND ART

In recent years, coating films having metallic luster have attracted attention in coating film appearance of automobile coating. Such coating films are required to have a high flip-flop property (so-called FF property). In order to improve the flip-flop property, it is necessary for pigment to exist with a certain orientation in a coating composition. In addition, it is preferable that a coating film having metallic luster satisfies a dense feeling that does not exhibit graininess (glare).

JP-A-H11-80620 (Patent Literature 1) discloses a solvent-based coating composition wherein a coating film of the coating composition shows metallic luster. In the case of a solvent-based coating composition, even if the solid content (also referred to as nonvolatile content, NonVolatile=NV) of the coating material is set low, the viscosity of the coating composition can be maintained appropriately because the solvent vaporizes appropriately during coating, and therefore the coating composition can be applied to an article to be coated without deteriorating the wettability of the coating composition. If the NV can be set low, film thickness can be made uniform and a superior metallic coating film can be formed.

On the other hand, in recent years, the awareness of environmental load reduction has increased, and replacement with environmentally friendly products has been required. In the field of coatings, for example, it is required to reduce the amount of an organic solvent to be used, and it is also required to use an aqueous coating composition.

However, when a coating film with metallic luster is formed using an aqueous coating composition, the solvent vaporizes in a slight amount during coating, and therefore an aqueous coating composition having a low NV flows from an article to be coated during coating, for example, so that it may cause defective orientation of the pigment. Also, if the NV of an aqueous coating composition is adjusted low, pigment is prone to settle and unevenness is prone to occur in coating film appearance.

For this reason, generally, the NV of an aqueous coating composition for forming a coating film having metallic luster is set high (for example, NV=25%). If the NV is made high, the coating composition viscosity can be made high and it is possible to prevent the coating composition from flowing, and it is also possible to prevent pigment from settling.

However, since an aqueous coating composition having a high NV has a high viscosity as well, there has arisen a problem that pigment is difficult to orient uniformly. For example, when a coating film is formed using an aqueous coating composition having a high NV, the orientation of the pigment is not uniform, so that graininess (glare) occurs in the coating film and the power to hide a base material decreases. Further, it is not suitable for forming a coating film uniform in thickness. In order to solve such a problem, it has been attempted to improve the orientation of the pigment and produce a metallic tone by stacking a plurality of thin films formed from an aqueous coating composition having a high NV. However, the orientation of the pigment has not been improved yet, and no satisfactory metallic coating films have been obtained. In addition, there are many problems such that it takes a long time to form a plurality of coating films.

In addition, a design having many curved surfaces has recently been adopted in industrial products such as automobiles, and therefore there have been required coating films that can easily coat articles with a complicated shape and have beautiful metallic luster.

CITATION LIST

Patent Literature

Patent Literature 1: JP-A-H11-80620

SUMMARY OF THE INVENTION

Technical Problems

In view of the above-described state of the art, it is an object of the present invention to provide an aqueous coating composition capable of improving the orientation of pigment and capable of forming a metallic coating film that is superior in glittering feeling and has a high flip-flop property as well as does not exhibit graininess. In addition, another object of the present invention is to provide a method for forming a metallic coating film using an aqueous coating composition having such characteristics.

Solution to Problems

The present invention provides:

[1] an aqueous coating composition comprising a coating film-forming resin, a curing agent, a scaly pigment, an inorganic viscosity agent, a hydrophobic associative viscosity agent, and a dispersant, wherein the composition contains the inorganic viscosity agent in an amount of 1 to 7 parts by mass based on 100 parts by mass of the total resin solid content of the coating film-forming resin and the curing agent, and the composition contains the hydrophobic associative viscosity agent in an amount of 1 to 15 parts by mass based on 100 parts by mass of the total resin solid content of the coating film-forming resin and the curing agent;

[2] the aqueous coating composition according to [1], wherein the composition has a nonvolatile content (NV) of 3% to 18%;

[3] the aqueous coating composition according to [1] or [2], where the mass concentration (PWC) of the scaly pigment in the aqueous coating composition satisfies the following formula:

PWC=(the total mass of the scaly pigment)/[(the total mass of the resin solid content of the coating film-forming resin and the resin solid content of the curing agent)+(the total mass of the scaly pigment)]×100(%), the range of the PWC is 5% to 35%;

[4] the aqueous coating composition according to any one of [1] to [3], wherein the composition comprises the scaly pigment that has an aspect ratio of 10 to 2000;

[5] the aqueous coating composition according to any one of [1] to [4], wherein the coating film-forming resin comprises at least one species selected from among an acrylic-based resin, a urethane-based resin, and a polyester-based resin.

[6] the aqueous coating composition according to any one of [1] to [5], wherein the scaly pigment comprises a pigment selected from among a metal flake, a metal oxide flake, a vapor-deposited metal pigment, a pearl pigment, and mixtures thereof;

[7] the aqueous coating composition according to any one of [1] to [6], wherein the scaly pigment comprises a pigment selected from among an aluminum pigment, a chromium pigment, an alumina pigment, a chromium oxide pigment, and mixtures thereof;

[8] the aqueous coating composition according to any one of [1] to [7], wherein the scaly pigment comprises a pigment selected from among a vapor-deposited aluminum pigment, a vapor-deposited chromium pigment, a vapor-deposited alumina pigment, a vapor-deposited chromium oxide pigment, and mixtures thereof;

[9] the aqueous coating composition according to any one of [1] to [8], wherein the inorganic viscosity agent is a layered silicate;

[10] the aqueous coating composition according to any one of [1] to [9], wherein the hydrophobic associative viscosity agent is a urethane-based hydrophobic associative viscosity agent;

[11] the aqueous coating composition according to any one of [1] to [10], wherein the dispersant is a polymer type dispersant having at least one member selected from an anionic group, a cationic group, and a nonionic group.

Furthermore, the present invention provides:

[12] a method for forming a metallic coating film, comprising:
a step (1) of applying an aqueous coating composition onto an article to be coated to form an uncured coating film,
a step (2) of applying a clear coating composition onto the uncured coating film to form an uncured clear coating film, and
a step (3) of heating and curing the uncured coating films obtained in the steps (1) and (2) at a time to form a multilayer coating film, wherein
the aqueous coating composition is the aqueous coating composition according to any one of [1] to [11], and
the coating film formed from the aqueous coating composition and heated and cured has a thickness of 1 to 8 μm;

[13] a method for forming a metallic coating film, comprising:
a step of applying an aqueous intermediate coating composition onto an article to be coated to form an uncured intermediate coating film,
a step (1) of applying an aqueous coating composition to form an uncured coating film,
a step (2) of applying a clear coating composition onto the uncured coating film to form an uncured clear coating film, and
a step (3) of heating and curing the uncured intermediate coating film and the uncured coating films obtained in the steps (1) and (2) at a time to form a multilayer coating film, wherein
the aqueous coating composition is the aqueous coating composition according to any one of [1] to [11], and
the coating film formed from the aqueous coating composition and heated and cured has a thickness of 1 to 8 μm.

Advantageous Effects of Invention

The aqueous coating composition of the present invention can form a metallic coating film that has a superior glittering feeling as well as superior physical properties including coating film strength and does not exhibit graininess. For example, a coating film formed from the aqueous coating composition of the present invention exhibits a coating film appearance at least comparable with physical properties of a coating film with metallic luster formed from a solvent-based coating composition and can have good coating film physical properties. It also is superior in water resistance.

In addition, the aqueous coating composition of the present invention can prevent the pigment from settling and the coating composition itself from flowing despite its low nonvolatile content (NV). Further, since the aqueous coating composition of the present invention can form a thin film, it can make the pigment oriented uniformly, affording a superior metallic coating film.

Furthermore, the aqueous coating composition of the present invention can be applied without causing sagging even if the shape of the article to be coated is complicated.

Since the coating composition according to the present invention is an aqueous coating composition, it gives fewer loads on the environment and workers.

DESCRIPTION OF EMBODIMENTS

First, the process leading to the present invention will be described. As described above, in recent years, attempts have been made to form a coating film having a high FF property by using an aqueous coating composition having a high NV. However, as described above, when an aqueous coating composition having a high NV is used, the orientation of the pigment has not been improved yet, and no satisfactory metallic coating films have been obtained. In addition, there are many problems, such as the fact that it takes a long time to form a plurality of coating films.

On the other hand, there is a problem that if an aqueous coating composition with a low NV is used, for example, if a hydrophobic associative viscosity agent is used, then the coating composition has a lower viscosity and settling and sagging occur. In addition, there is a problem that if a self-associative viscosity agent is used, then the water resistance of a coating film may deteriorate and a hydrophobic substance tends to be aggregated by circulation. Thus, there have been many problems with obtaining a metallic coating film using an aqueous coating composition.

The aqueous coating composition of the present invention, which solves all such problems, contains an inorganic viscosity agent in an amount of 1 to 7 parts by mass based on 100 parts by mass of the total resin solid content of a coating film-forming resin and a curing agent, and also contains a hydrophobic associative viscosity agent in an amount of 1 to 15 parts by mass, for example 1 part by mass or more and less than 15 parts by mass, based on 100 parts by mass of the total resin solid content of the coating film-forming resin and the curing agent. Preferably, the inorganic viscosity agent is contained in an amount of 2 to 7 parts by mass, for example, 2 to 5 parts by mass, based on 100 parts by mass of the total resin solid content of the coating film-forming resin and the curing agent. Preferably, the hydrophobic associative viscosity agent is contained in an amount of 2 to 15 parts by mass, for example 2 parts by mass or more and less than 15 parts by mass, in an amount of 2 to 10 parts by mass in one embodiment, or in an amount of 2 to 5 parts by mass in another embodiment, based on 100 parts by mass of the total resin solid content of the coating film-forming resin and the curing agent.

In the present invention, the coating film-forming resin and the curing agent are collectively referred to as "main resin" in some cases. The "resin solid mass of the main resin" means the total solid amount of the coating film-forming resin and the curing agent. For example, 100 parts by mass of the resin solid content of the "main resin" corresponds to 100 parts by mass of the sum total of the resin solid contents of the coating film-forming resin and the curing agent.

With regard to containing the inorganic viscosity agent and the hydrophobic associative viscosity agent in prescribed parts by mass, respectively, based on 100 parts by mass of the total resin solid content of the coating film-forming resin and the curing agent as described above, the aqueous coating composition of the present invention can avoid settling of a scaly pigment during the formation of a coating film and can avoid clouding of a coating film. Further, since the orientation of the scaly pigment can be made uniform, a coating film having superior design-ability can be obtained. In addition, it was found that the coating film has superior water resistance due to the incorporation of the prescribed viscosity agents in the prescribed amounts.

Furthermore, by containing the inorganic viscosity agent and the hydrophobic associative viscosity agent in a prescribed ratio, the aqueous coating composition of the present invention has a low nonvolatile content (NV), for example, an NV of 3% to 18%, preferably 6% to 15%, more preferably 8% to 12% though it is aqueous.

The nonvolatile content (NV) is a value calculated from [(mass of coating after drying)/(mass of coating before drying]]×100(%). The nonvolatile content can be controlled by adjusting the amount of a solvent in the coating composition.

If the nonvolatile content is higher than 18%, the volumetric shrinkage of a coating film is small and therefore sufficient metallic luster cannot be obtained. When the nonvolatile content is less than 3%, a self-associative viscosity agent may be required excessively, so that the properties of a coating film may deteriorate, for example, the anti-sagging property of a coating composition may deteriorate and the coating film workability may deteriorate. In addition, the water resistance may deteriorate. The nonvolatile content is measured by the method of JIS K5601-1-2 (heating residue).

Since the aqueous coating composition of the present invention exhibits a low nonvolatile content (NV) as described above, the film thickness of a coating film can be made thin and uniform. For example, the dry film thickness of a coating film to be formed is 1 to 8 µm, more preferably 1 to 6 µm. In addition, in one embodiment, a coating film is formed from a coating composition having a low NV, the scaly pigment can be uniformly oriented due to volume shrinkage of the coating composition after coating, and the coating film can have high flip-flop property. That is, unlike conventional aqueous coating compositions being high in NV (for example, NV=25%), the aqueous coating composition of the present invention can freely form a thin film uniform in thickness and can form a coating film having high flip-flop property, and therefore, it can form a superior metallic coating film without forming a metallic coating film by stacking a plurality of thin films. Depending on the required coating film appearance or the like, a metallic coating film may be formed by stacking a plurality of coating films formed from the aqueous coating composition of the present invention.

In addition, despite having such a low NV, the aqueous coating composition of the present invention can prevent the phenomenon of sagging of the coating composition and settling of the scaly pigment. Furthermore, a coating film with uniform beautiful metallic luster can be formed even on an article to be coated having a complicated shape having many curved surfaces.

In the aqueous coating composition of the present invention, the content ratio (mass ratio) of the inorganic viscosity agent to the hydrophobic associative viscosity agent is not particularly limited as long as the inorganic viscosity agent and the hydrophobic associative viscosity agent are used in combination. For example, the content ratio (mass ratio) of the inorganic viscosity agent and the hydrophobic associative viscosity agent may be inorganic viscosity agent/hydrophobic associative viscosity agent=1/1 to 5/1, and in another embodiment, inorganic viscosity agent/hydrophobic associative viscosity agent=1/1 to 1/5.

<Coating Film-Forming Resin>

The coating film-forming resin in the present invention preferably has a number average molecular weight of 5000 to 30000, more preferably 7000 to 25000. If the number average molecular weight is less than 5000, the workability and the curability may be insufficient, whereas if exceeding 30000, the workability in coating composition will deteriorate due to an excessively reduced nonvolatile content. In the present description, a molecular weight is determined by GPC using styrene polymers as standards.

The coating film-forming resin preferably has a hydroxyl value of 20 to 180, more preferably a hydroxyl value of 30 to 160. If the hydroxyl value of the coating film-forming resin exceeds 180, the water resistance of a coating film may deteriorate, whereas if being less than 20, the curability of a coating film may deteriorate. The coating film-forming resin preferably has an acid value of 10 to 80 mg KOH/g, and more preferably has an acid value of 15 to 70 mg KOH/g. If the acid value of the coating film-forming resin exceeds 80, the water resistance of a coating film may deteriorate, whereas if being less than 10, the curability of a coating film may deteriorate.

Preferable examples of the film-forming resin include coating film-forming resins such as an acrylic-based resin, a polyester-based resin, an alkyd-based resin, a polyether-based resin, a polyolefin-based resin, an urethane-based resin, and a melamine-based resin. These resins may be used singly or in combination of two or more of them. It is preferable to use a coating film-forming resin selected from among acrylic-based resin, polyester-based resin, melamine-based resin, urethane-based resin, and mixtures thereof from the viewpoints of coating film strength, weather resistance, and water resistance. For example, the coating film-forming resin includes at least one species selected from among acrylic-based resins, urethane-based resins and polyester-based resin s. In one embodiment, acrylic-based resin and urethane-based resin may be used in combination. In this embodiment, acrylic-based resin can be used in an amount of 40 parts by mass to 60 parts by mass in solid content amount based on 100 parts by mass of the total resin solid content of the coating film-forming resin and the curing agent, and urethane-based resin can be used in an amount of 1 to 20 parts by mass in solid content amount based on 100 parts by mass of the total resin solid content. In one embodiment, a plurality of species of acrylic-based resin are used, the sum total of the parts by mass of the respective species of acrylic-based resin can be appropriately adjusted to fall within the above range. And in one embodiment, a plurality of species of urethane-based resin are used, the sum total of the parts by mass of the respective species of urethane-based resin can be appropriately adjusted to fall within the above range.

<Curing Agent>

The aqueous coating composition of the present invention contains a curing agent that appropriately corresponding to the type of the curable functional group which the coating film-forming resin has.

Conventionally known curing agents can be used as the above curing agent; for example, an amino resin, a blocked isocyanate resin, epoxy compounds, aziridine compounds, carbodiimide compounds, or oxazoline compounds are used. From the viewpoints of the performance and cost of a resulting coating film, amino resin and/or blocked isocyanate resin are generally used.

The amino resin is not particularly limited, and a water-soluble melamine resin and/or a water-insoluble melamine resin can be used.

The blocked isocyanate resin can be prepared by adding a blocking agent having an active hydrogen to polyisocyanate such as trimethylene diisocyanate, hexamethylene diisocyanate, xylylene diisocyanate, and isophorone diisocyanate. Such a blocked isocyanate resin, upon heating, dissociates a blocking agent and generates an isocyanate group and this group reacts with a functional group in a resin component to cure the resin.

The amount of the curing agent is preferably 5 to 50 parts by mass, and more preferably 5 to 40 parts by mass, based on 100 parts by mass of the resin solid content of the main resin (the coating film-forming resin and the curing agent), for example. If the amount of the curing agent is less than 5 parts by mass, the curability may be insufficient. If the loading exceeds 50 parts by mass, there is a possibility that a cured film may be too hard and brittle.

In the present description, a combination comprising at least a coating film-forming resin, a curing agent and a solvent may be referred to as a "base coating composition" in some cases.

<Scaly Pigment>

The aqueous coating composition of the present invention contains a scaly pigment. The scaly pigment in the present invention is a pigment which gives metallic luster to a coating film. In the aqueous coating composition of the present invention, one species of scaly pigment may be used alone, or a combination of a plurality of species of scaly pigment may be used.

In the aqueous coating composition of the present invention, where the mass concentration (PWC) of the scaly pigment in the aqueous coating composition is expressed by the following formula:

PWC=(the total mass of the scaly pigment)/[(the total mass of the resin solid content of the coating film-forming resin and the resin solid content of the curing agent)+(the total mass of the scaly pigment)]×100(%), the range of the PWC is 5% to 35%, for example, the range of the PWC is preferably 5% to 30%, more preferably 5% to 25%. In one embodiment, the mass concentration of the scaly pigment is within the above range, the scaly pigment is uniformly oriented after a coating film is formed, so that a coating film having superior luster can be formed.

By contrast, when the mass concentration (PWC) of the scaly pigment is less than 5%, there is a possibility that the hiding property of a coating film obtained may be deteriorated. When the content (PWC) of scaly pigment (scaly aluminum pigment) exceeds 35%, the effect along with the increase in the content may be not exerted and the cost may be excessively high.

According to the present invention, it has been found that the content (PWC) of the scaly pigment (scaly aluminum pigment) is within the range of 5% to 35% in one embodiment, a resulting coating film is superior in hiding property and a coating film that is further superior in design-ability (metallic tone) can be formed.

Thus, the aqueous coating composition of the present invention can contain scaly pigment (scaly aluminum pigment) in an amount expressed by a mass concentration (PWC) not exceeding a prescribed range depending on the purpose and the required coating film appearance.

Here, the "resin solid content" means the total solid content of the coating film-forming resin and the curing agent contained in the aqueous coating composition, as described above.

The scaly pigment in the present description has, for example, a shape having an average particle diameter (D50) of 5 to 25 μm and a thickness of 5 to 200 nm. Here, the average particle diameter means a median diameter of a volume-based particle size distribution measured by a laser diffraction scattering method using Microtrac particle size distribution analyzer MT3300 (trade name, manufactured by Nikkiso Co., Ltd.). The thickness means an average value of 100 or more of measurements measured by observing a cross section of a coating film containing the scaly pigment with a scanning electron microscope (SEM).

In one embodiment, the scaly pigment comprises a scaly pigment having an aspect ratio of preferably from 10 to 2000, more preferably from 50 to 1000. By using a scaly pigment having such a shape, it becomes possible to form a coating film that has superior metallic luster and exhibits a high flip-flop property because the scaly pigment tends to be uniformly oriented with the volumetric shrinkage of the aqueous coating composition after the application thereof. In addition, such use does not adversely affect the adherability between an article to be coated and a coating film. Further, by having an aspect ratio within such a range, the pigment is more easily oriented uniformly, and a metallic feeling of a coating film obtained is enhanced. Furthermore, a further improved appearance can be obtained. In the case of a commercially available scaly pigment, the aspect ratio thereof may be expressed by an average aspect ratio, and a scaly pigment having an average aspect ratio falling within the above range may be used.

The scaly pigment may comprise a pigment selected from among a metal flake, a metal oxide flake, a pearl pigment, and mixtures thereof. Examples of the metal flake include aluminum, chromium, gold, silver, copper, brass, titanium, nickel, nickel chromium, and stainless steel. Examples of the metal oxide flake include oxides of the aforementioned metal flakes, for example, alumina and chromium oxide.

Further, in order to prevent a metal flake, a metal oxide flake, pearl pigment, etc. from reacting with water to generate gas, metal coating, e.g. a coating of a metal compound such as molybdic acid, chromic acid, yttrium and a rare earth metal, or an organic polymer coating, e.g. a coating of an organic polymer prepared using a polymerizable monomer, may be formed on the metal flake, the metal oxide flake, and the pearl pigment.

For example, the metal flake, the metal oxide flake, and the pearl pigment may have a coating containing silicon dioxide, zirconium oxide, aluminum oxide, chromium oxide, polymerized synthetic resins, vanadium oxides, molybdenum oxides and/or molybdenum peroxides, phosphates, phosphites, borates, chromates, and mixtures or combinations thereof.

For example, in the case of using chromium oxide or the like, toxicity can be removed by using a chemically inactivated material.

The scaly pigment may contain a vapor-deposited metal pigment. Such scaly pigments are generally prepared by vapor depositing a metal thin film (metal oxide thin film) on a base film, peeling off the base film, and then pulverizing the deposited metal film into metal flakes (metal oxide flakes).

The metal material to be deposited is not particularly limited and, for example, the materials described for the metal flake and the metal oxide flake can be used. Preferably, the scaly pigment comprises vapor-deposited aluminum pigment, vapor-deposited chromium pigment, vapor-deposited alumina pigment, and vapor-deposited chromium oxide pigment. The vapor-deposited metal pigment may, if desired, have a coating like that described above on the surface thereof.

Commercially available pigments may be used as the scaly pigment and examples thereof include METALURE(registered trademark) series, SILVERSHINE(registered trademark) series, HYDROSHINE(registered trademark) series, Liquid Black(registered trademark), PLISMATIC(registered trademark) series produced by ECKART, FD series, GX series and BS series produced by Asahi Kasei Chemicals Corporation, and 46 series and 63 series produced by Toyo Aluminum Co., Ltd.

<Inorganic Viscosity Agent>

The inorganic viscosity agent in the present invention is preferably a layered material having a laminated structure in which a large number of inorganic crystal layers are stacked. Since the inorganic viscosity agent having a layered structure as above swells in the coating composition and forms a card house structure in the coating composition, it imparts a moderate viscosity to the coating composition and provides superior coating film strength.

Examples of the shape of the primary particles of the inorganic viscosity agent include a disk shape, a plate shape, a spherical shape, a granular shape, a cubic shape, a needle shape, a rod shape and an indefinite shape; a disk shape or a plate shape is preferable.

The inorganic viscosity agent in the present invention includes layered silicates (silicate minerals), halogenated minerals, oxidized minerals, carbonate minerals, borate minerals, sulfate minerals, molybdate minerals, tungstate minerals, phosphate minerals, arsenate minerals, and vanadate minerals. Layered silicates are preferred because they impart a moderate viscosity and superior coating film strength to a coating composition and provide superior water resistance when used in combination with a hydrophobic associative viscosity agent.

Examples of layered silicates include smectite clay minerals such as natural or synthetic hectorite, saponite, stevensite, beidellite (hidellite), montmorillonite, nontronite, and bentonite, swellable mica clay minerals such as Na-type tetrasilisic fluorine mica, Li-type tetrasilisic fluorine mica, Na-type fluorine teaniolite, and Li-type fluorine teaniolite, vermiculite, kaolinite, and mixtures thereof.

Examples of commercially available inorganic viscosity agents include LAPONITE XLG (synthetic hectorite-like substance produced by BYK), LAPONITE RD (synthetic hectorite-like substance produced by BYK), LAPONITE EP (synthetic hectorite-like substance produced by BYK), OPTIGEL WX (Na-substituted bentonite, produced by BYK), THERMABIS (synthetic hectorite-like substance, produced by Henkel Corp.), SMECTONE SA-1 (saponite-like substance produced by Kunimine Industries Co., Ltd.), BENGEL (natural bentonite sold by Hojun Co., Ltd.), Kunipia F (natural montmorillonite sold by Kunimine Industries Co., Ltd.), BEEGUM (natural hectorite produced by Vanderbilt Corporation, USA), DIMONITE (synthetic swellable mica, produced by Topy Industries, Ltd.), SOMASIF (synthetic swellable mica, produced by CO-OP Chemical Co., Ltd.), SWN (synthetic smectite, produced by CO-OP Chemical Co., Ltd.), and SWF (synthetic smectite, produced by CO-OP Chemical Co., Ltd.).

As described above, the aqueous coating composition of the present invention contains the inorganic viscosity agent in an amount of 1 to 7 parts by mass based on 100 parts by mass of the total resin solid content of the coating film-forming resin and the curing agent, preferably 2 to 7 parts by mass, for example 2 to 5 parts by mass, of the inorganic viscosity agent based on 100 parts by mass of the total resin solid content of the coating film-forming resin and the curing agent.

By containing the inorganic viscosity agent in such a range, it is possible to avoid settling of the scaly pigment during formation of a coating film and generation of cloud in the coating film. In addition, since the orientation of the scaly pigment can be made uniform, a coating film having superior design-ability, especially a superior metallic tone, can be obtained. Furthermore, by incorporating a prescribed inorganic viscosity agent in a prescribed amount, the coating film can have superior water resistance, and superior high-temperature water-resistant adherability.

<Hydrophobic Associative Viscosity Agent>

The hydrophobic associative viscosity agent of the present invention means a viscosity agent that increases the viscosity of an aqueous coating composition through a hydrophobic interaction generated with at least one of the hydrophobic groups possessed by the coating film-forming resin, the curing agent, the scaly pigment, the inorganic viscosity agent, and the dispersant contained in the aqueous coating composition. By using a hydrophobic associative viscosity agent, it is possible to obtain high finish without defects in coating such as repelling or denting of the coating composition.

Particularly preferred as the hydrophobic associative viscosity agent are a polyacrylic acid-based viscosity agent with a hydrophobic monomer copolymerized, a polyurethane-based viscosity agent having a hydrophobic chain in the molecule, a urethane-urea-based viscosity agent with at least a part of the main chain being a hydrophobic urethane chain, and an amide-urea-based viscosity agent with at least a part of the main chain being a hydrophobic amide chain, and more preferred are a polyurethane-based viscosity agent having a hydrophobic chain in the molecule and a urethane-urea-based viscosity agent with at least a part of the main chain being a hydrophobic urethane chain. By using such a hydrophobic associative viscosity agent, in addition to the above-mentioned effects, a superior settling prevention property and a superior sagging prevention property can be exhibited in many systems containing an aqueous material such as aqueous coating compositions.

For example, urethane-based hydrophobic associative viscosity agents such as a polyurethane-based viscosity agent and a urethane-urea-based viscosity agent have a characteristic that viscosity is prone to be developed under a low shear and viscosity is less prone to be developed under a high shear, and are superior in thixotropy. Based on such characteristics, the aqueous coating composition of the present invention can be suitably used, for example, for spray coating. Furthermore, a coating film obtained from an aqueous coating composition containing such a hydrophobic associative viscosity agent has superior water resistance.

Examples of commercially available hydrophobic associative viscosity agents include BYK-425 (urea-modified urethane compound: produced by BYK-Chemie GmbH), BYK-420 (urethane-urea compound: produced by BYK-Chemie GmbH), BYK-430 (amide-urea compound: produced by BYK-Chemie GmbH), PU 1250 (polyurethane polymer, produced by BASF), SN Thickener-660T, SN Thickener-665T (urethane-based: produced by SAN NOPCO Ltd.), RHEOLATE 216 (urethane-urea compound: produced by ELEMENTIS), PRIMAL RM-12W and PRIMAL RM-895 (urethane type: produced by The Dow Chemical Company).

The aqueous coating composition of the present invention contains a hydrophobic associative viscosity agent in an amount of 1 to 15 parts by mass, for example, 1 part by mass or more and less than 15 parts by mass, based on 100 parts by mass of the total resin solid content of the coating film-forming resin and the curing agent. Preferably, the hydrophobic associative viscosity agent is contained in an amount of 2 to 15 parts by mass, for example 2 parts by mass or more and less than 15 parts by mass, in an amount of 2 to 10 parts by mass in one embodiment, or in an amount of 2 to 5 parts by mass in another embodiment, based on 100 parts by mass of the total resin solid content of the coating film-forming resin and the curing agent.

By containing the hydrophobic associative viscosity agent in such a range, it is possible to avoid settling of the scaly pigment during formation of a coating film and to avoid generation of cloud in the coating film. In addition, since the orientation of the scaly pigment can be made uniform, a coating film having superior design-ability, especially a superior metallic tone, can be obtained. Furthermore, by incorporating a prescribed viscosity agent in a prescribed amount, the coating film can have superior water resistance, and superior high-temperature water-resistant adherability.

Further, for example, by using an inorganic viscosity agent and a hydrophobic associative viscosity agent in combination within the above ranges, it is possible to suppress settling of the scaly pigment during formation of a coating film more effectively, and a coating film with superior design-ability, especially superior metallic tone is obtained.

<Dispersant>

The aqueous coating composition of the present invention contains a dispersant. The dispersant preferably has a substituent which provides dispersion stability to metal or metal oxide. Having such a substituent in a dispersant ensures that the dispersant can effectively coat a scaly pigment and, furthermore, steric hindrance can be provided to the pigment depending on the molecular weight of the dispersant, so that aggregation of the scaly pigment can be prevented. In addition, such a dispersant can enhance the dispersibility of the pigment.

Further, the dispersant preferably has a side chain with high hydrophobicity. Having a side chain with high hydrophobicity renders the dispersant capable of being dissolved in a solvent such as 2-ethylhexyl alcohol (2EHOH) and monoethylene glycol mono-2-ethylhexyl ether (EHG).

The dispersant may be either a polymer type dispersant or a low molecular surfactant type dispersant, and a polymer type dispersant is preferable from the viewpoint of preventing aggregation of the scaly pigment. The polymer type dispersant is preferably a polymer type dispersant having at least one member selected from among an anionic group, a cationic group, and a nonionic group, more preferably at least one species selected from among a polymer type dispersant having a side chain with high hydrophobicity, a polymer type dispersant having an anionic group, a polymer type dispersant having a nonionic group, and mixtures thereof. Examples of the anionic group include a phosphoric acid group and a carboxylic acid group. Examples of the nonionic group include a polyoxyalkylene group. However, the polymer type dispersant is not limited to these groups.

As described above, known polymer dispersants such as anionic, cationic, or nonionic acrylic copolymers and block copolymers can be used as the polymer type dispersant. In one embodiment, from the viewpoint of dispersion stability, an anionic or nonionic polymer is preferable and an acrylic copolymer or block copolymer is preferable.

As the polymer type dispersant, known dispersants can be used and commercially available products may be used. Examples thereof include the DISPERBYK series produced by BYK-Chemie GmbH, for example, DISPERBYK, DISPERBYK-194, DISPERBYK-194N, and DISPERBYK-192; and Solsperse 41000, Solsperse 43000, Solsperse 44000, and Solsperse 47000 produced by The Lubrizol Corporation. DISPERBYK-192, DISPERBYK-194N, and DISPERBYK can be preferably used.

The amount of the dispersant is preferably 1 to 5 parts by mass based on 100 parts by mass of the total resin solid content of the coating film-forming resin and the curing agent, that is, based on 100 parts by mass of the resin solid content of the main resin. In one embodiment, the amount is within such a range, the scaly pigment can be effectively prevented from aggregating and the dispersibility of the pigment can be enhanced.

<Organic Solvent>

The aqueous coating composition of the present invention may contain an organic solvent. For example, an alcoholic organic solvent having a solubility in water of 0.01 to 5.0% by mass and a boiling point of 160 to 200° C. If necessary, a glycol ether-based organic solvent having a solubility in water of 0.01 to 5.0% by mass and a boiling point of 205 to 240° C. may be contained. Known solvents may be used in combination or may be used alone. The aforementioned solubility is the mass of an organic solvent soluble in 100 parts by mass of water at 20° C., expressed in percentage.

When the solubility of the alcoholic organic solvent in water is less than 0.01% by mass, there is a possibility of problems such as that the coating composition viscosity remarkably increases, whereas when the solubility exceeds 5.0% by mass, there is a possibility of problems such as that the coating composition viscosity remarkably lowers and the coating workability deteriorates. The solubility in water of the alcoholic organic solvent is preferably 0.05 to 3.0% by mass.

When the boiling point of the alcoholic organic solvent is lower than 160° C., there is a possibility to cause problems such as deterioration in coating workability, especially in anti-foaming property, and when the boiling point exceeds 200° C., there is a possibility to cause problems such as deterioration in coating workability, especially anti-sagging property. The boiling point of the alcoholic organic solvent is preferably 170 to 190° C.

The alcoholic organic solvent (solubility, boiling point) is selected from the group consisting of heptanol (0.5% by mass, 168° C.), 2-ethylhexyl alcohol (0.1% by mass, 184° C.) and cyclohexanol (4.0% by mass, 161° C.). From the viewpoint of the stability (particle size) of the resin aqueous dispersion, 2-ethylhexyl alcohol (2EHOH) is preferable.

The amount of the alcoholic organic solvent in the aqueous coating composition is, for example, 10 to 150 parts by mass, preferably 50 to 100 parts by mass, based on 100 parts by mass of the total resin solid content of the coating film-forming resin and the curing agent. If the content is less than 10 parts by mass, the effect of preventing the scaly pigment from aggregating may deteriorate, whereas if the content exceeds 150 parts by mass, coating workability such as anti-foaming property may deteriorate.

When two or more organic solvents are used, the total amount of the organic solvents may be adjusted to fall within the above range.

In one embodiment, the alcoholic organic solvent is added to the aqueous coating composition, atomization at the time of coating enhances so it is possible to significantly prevent aggregation of the scaly pigment.

If necessary, a glycol ether-based organic solvent having a solubility in water of 0.01 to 5.0% by mass and a boiling point of 205 to 240° C. may be added to the aqueous coating composition of the present invention.

When the solubility of the glycol ether-based organic solvent in water is less than 0.01% by mass, there is a possibility of problems such as that the coating composition viscosity remarkably increases, whereas when the solubility exceeds 5.0% by mass, there is a possibility of problems such as that the coating composition viscosity remarkably lowers and the coating workability deteriorates. The solubility in water of the glycol ether-based organic solvent is preferably 0.05 to 3.0% by mass.

If the boiling point of the glycol ether-based organic solvent is less than 205° C., there is a possibility of problems such as that coating workability, especially anti-foaming property deteriorates, whereas if the boiling point exceeds 240° C., there is a possibility of problems such as that coating workability, especially anti-sagging property deteriorates. The boiling point of the glycol ether-based organic solvent is preferably 210 to 230° C.

The glycol ether-based organic solvent (solubility, boiling point) is selected from the group consisting of ethylene glycol monohexyl ether (hexyl glycol, 1.0% by mass, 208° C.), ethylene glycol mono-2-ethylhexyl ether (2-ethylhexyl glycol (EHG), 0.2% by mass, 225° C.) and dipropylene glycol monobutyl ether (5.0% by mass, 215° C.). From the viewpoint of the stability (particle size) of the hydrophobic melamine resin aqueous dispersion and the acrylic emulsion resin, ethylene glycol mono-2-ethylhexyl ether (EHG) is preferred.

The content of the glycol ether-based organic solvent in the aqueous coating composition is, for example, 10 to 150 parts by mass, preferably 50 to 100 parts by mass, based on 100 parts by mass of the total resin solid content of the coating film-forming resin and the curing agent. If the content is less than 10 parts by mass, the effect of preventing the scaly pigment from aggregating may deteriorate, whereas if the content exceeds 150 parts by mass, coating workability such as anti-foaming property may deteriorate.

When two or more organic solvents are used, the total amount of the organic solvents may be adjusted to fall within the above range.

When the aqueous coating composition of the present invention contains an alcoholic organic solvent and a glycol ether-based organic solvent, the mass ratio of the alcoholic organic solvent/the glycol ether-based organic solvent is 1/1 to 3/1. When the mass ratio is less than 1/1, there is a possibility that the coating composition viscosity decreases and deficiency in the coating workability may occur, whereas if the mass ratio exceeds 3/1, there is a possibility that the stability of the coating composition deteriorates with time.

In addition, a glycol ether-based organic solvent may be added alone to the aqueous coating composition.

<Other Components>

The aqueous coating composition of the present invention may contain, in addition to the above components, water, an antifoaming agent, a coloring pigment, an extender pigment, an ultraviolet absorber, a hindered amine light stabilizer, an antioxidant, crosslinked resin particles, a surface conditioner, a film-forming assistant, glittering agents such as aluminum flakes and mica, a rust preventive pigment, and a rust inhibitor may be blended.

<Method for Producing Aqueous Coating Composition>

The method for producing the aqueous coating composition is not particularly limited as long as the above components can be dispersed uniformly therewith, and examples thereof include methods known to those skilled in the art, such as a kneader, a mill or a roll mill.

<Method of Forming Metallic Coating Film>

The present invention further provides, a method for forming a metallic coating film, comprising:

a step (1) of applying an aqueous coating composition onto an article to be coated to form an uncured coating film, a step (2) of applying a clear coating composition onto the uncured coating film to form an uncured clear coating film, and a step (3) of heating and curing the uncured coating film obtained in the step (1) and the uncured clear coating film obtained in the step (2) at a time to form a multilayer coating film, wherein the coating film formed from the aqueous coating composition and heated and cured has a thickness of 1 to 8 μm.

In another embodiment, the present invention provides:

a method for forming a metallic coating film, comprising:

a step of applying an aqueous intermediate coating composition onto an article to be coated to form an uncured intermediate coating film, a step (1) of applying an aqueous coating composition to form an uncured coating film, a step (2) of applying a clear coating composition onto the uncured coating film to form an uncured clear coating film, and a step (3) of heating and curing the uncured intermediate coating film, the uncured coating film obtained in the step (1) and the uncured clear coating film obtained in the step (2) at a time to form a multilayer coating film, wherein the aqueous coating composition is the aqueous coating composition according to the present invention, and the coating film formed from the aqueous coating composition and heated and cured has a thickness of 1 to 8 μm.

Before applying the aqueous coating composition of the present invention to the article to be coated, an intermediate coating film may be formed.

The intermediate coating film is a coating film to be formed in order to impart a hiding property of the surface of the article to be coated, adherability with the article to be coated, and chipping resistance. The thickness of the intermediate coating film is, for example, 10 to 50 μm in dry film thickness. The intermediate coating composition to be used for forming the intermediate coating film contains a coating film-forming component, and examples thereof include those well known in the art, e.g., one containing a hydroxyl group-containing polyester-based resin and/or a hydroxyl group-containing acrylic-based resin, a melamine resin and/or a blocked polyisocyanate. Depending on the form of the coating composition to be used, these are dried or cured at a normal temperature or by heating after being applied. The above step (1) may be carried out by so-called wet-on-wet coating without curing the intermediate coating film.

In one embodiment, the forming method according to the present disclosure comprises: a step of applying an aqueous intermediate coating composition to an article to be coated to form an uncured intermediate coating film; and a step (1) of applying an aqueous coating composition to the uncured intermediate coating film to form an uncured coating film.

An article to be coated and used in the present invention is not particularly limited, and examples thereof include iron, copper, aluminum, tin, zinc, alloys containing these metals, products plated or vapor-deposited with these metals, plastics, and foams. The object may have a cured electrodeposition coating film formed on the surface thereof. The cured electrodeposition coating film is formed by electrodeposition coating an electrodeposition coating composition on an article to be coated and then heating and curing it. The electrodeposition coating composition is not particularly limited, and a known cationic electrodeposition coating composition or anionic electrodeposition coating composition can be used. The electrodeposition coating method and the heating and curing of the electrodeposition-coated coating film can be carried out by a method and under conditions commonly used for electrodeposition coating for automobile bodies.

The method for forming a metallic coating film in the present invention is preferably applied to a molded article made of these metals, for example, an external plate of an automobile body.

As the clear coating composition to be used in the present invention, there can be used a coating composition that is usually used as a clear coating composition for an automobile body. Examples of such a clear coating composition include a material containing a clear coating film-forming resin and, if necessary, a curing agent and other additives with them being dispersed or dissolved in a medium. Examples of the clear coating film-forming resin include an acrylic resin, a polyester resin, an epoxy resin, and an urethane resin. These can be used in combination with a curing agent such as an amino resin and/or an isocyanate resin. From the viewpoints of transparency or acid-resistant etching property, it is preferable to use a combination of an acrylic resin and/or a polyester resin and an amino resin, or an acrylic resin and/or a polyester-based resin having a carboxylic acid/epoxy curing system. For example, by use of a coating composition with an ultraviolet absorber and a light stabilizer incorporated in prescribed amounts to the resin components as the clear coating composition, adherability with an anticorrosive coating film is improved. Use of such a clear coating composition is preferable in that there can be realized anticorrosion property and adherability with which corrosion can be prevented even in use in a region susceptible to salt damage in the form of a multilayer coating film composed of a chemical conversion coating film, an anticorrosive coating film and a clear coating film.

The film thickness of a heated and cured coating film is 1 to 8 µm, more preferably 1 to 6 µm. By using the aqueous coating composition of the present invention, the NV of the aqueous coating composition can be adjusted low, and therefore, the pigment can be oriented uniformly without allowing the pigment to settle and a monolayer thin film can be formed. The thin film obtained is a metallic coating film that has superior luster and a high flip-flop property (so-called FF property) and satisfies a dense feeling without graininess (glare), and furthermore it has a good hiding power.

The means for applying the aqueous coating composition of the present invention is not particularly limited, and examples thereof include coating methods commonly used such as immersion, brush, roller, roll coater, air spray, airless spray, curtain flow coater, roller curtain coater, and die coater. These can be appropriately selected according to the article to be coated. For example, the application of the aqueous coating composition may be carried out by using an electrostatic coating machine. Conditions such as the discharge amount of a coating film can be appropriately set according to the film thickness of a coating film required, etc.

It is preferable to introduce a step of volatilizing moisture at 40 to 100° C. for 1 to 10 minutes after the application of the aqueous coating composition. A cured coating film with a high degree of crosslinking is obtained by setting the temperature at 80 to 180° C., preferably 120 to 160° C. after clear coating. If exceeding the upper limit, the coating film may become hard and brittle, whereas if being less than the lower limit, curing may not be sufficient. The curing time varies depending on the curing temperature, it is preferably 10 to 30 minutes at 120 to 160° C.

EXAMPLES

The present invention will be described hereafter in more detail by way of examples, to which the present invention is not intended to be limited. In the examples, "parts" and "%" are on a mass basis unless otherwise indicated.

Examples 1 to 10, Comparative Examples 1 to 9

Production Example

A base coating composition was prepared. Specifically, the following items were used.

There was prepared a base coating composition containing (1) 236 parts of an acrylic emulsion resin (average particle diameter: 150 nm, nonvolatile content: 20%, solid acid value: 20 mg KOH/g, hydroxyl value: 40 mg KOH/g) produced by Nippon Paint Co., Ltd., (2) 10 parts of a 10% by mass aqueous solution of dimethylethanolamine, (3) 28.3 parts of a water-soluble acrylic resin (nonvolatile content: 30%, solid acid value: 40 mg KOH/g, hydroxyl value: 50 mg KOH/g) produced by Nippon Paint Co., Ltd., (4) 8.6 parts of "Prime Pole PX-1000" (bifunctional polyether polyol, number average molecular weight: 400, hydroxyl value: 278 mg KOH/g, primary/secondary hydroxyl value ratio=63/37, nonvolatile content: 100%) produced by Sanyo Chemical Industries, Ltd., (5) 21.5 parts of "Cymel 204" (mixed alkylated melamine resin, nonvolatile content: 100%) produced by Mitsui Chemicals, Inc., Ltd.

(6) 26 parts of "NeoRez R-9603" (polycarbonate-based urethane emulsion resin, nonvolatile content: 33%) produced by Avecia, (7) 0.2 parts of lauryl acid phosphate, (8) 60 parts of 2-ethylhexanol, and (9) 30 parts of ethylene glycol mono-2-ethylhexyl ether.

In the base coating composition, the sum total of the solid mass of the coating film-forming resin and the solid mass of the curing agent (the solid content amount of the main resin) was 100 parts by mass.

The pigments shown below were added in the contents (PWC) shown in Table 1, and the viscosity agents and the dispersants shown below were blended in prescribed parts by mass based on 100 parts by mass of the solid content amount of the main resin as shown in Table 1, followed by diluting with water so as to achieve the nonvolatile contents (NV) shown in Table 1, and thus aqueous coating compositions were obtained.

In each of the Examples and Comparative Examples, a scaly pigment, an inorganic viscosity agent, a hydrophobic associative viscosity agent, and a dispersant were added to the above base coating composition in the loadings shown in the following table to prepare an aqueous coating composition.

<Scaly Pigment>
HYDROSHINE WS-3001 (produced by ECKART, aluminum pigment, average aspect ratio: about 500)
Liquid Black (produced by ECKART, chromium oxide pigment, average aspect ratio: about 500)
FD-5090 (produced by Asahi Kasei Chemicals Corporation, aluminum pigment, average aspect ratio: about 80)
<Inorganic Viscosity Agent>
LAPONITE RD (synthetic hectorite-like substance, produced by BYK)
LAPONITE EP (synthetic hectorite-like substance, produced by BYK)
OPTIGEL WX (Na-substituted bentonite, produced by BYK)
<Hydrophobic Associative Viscosity Agent>
BYK-425 (urea-modified urethane compound, produced by BYK-Chemie GmbH)
BYK-420 (urethane-urea compound, produced by BYK-Chemie GmbH)
<Dispersant>
DISPERBYK-192 (produced by BYK-Chemie GmbH)
DISPERBYK-194N (produced by BYK-Chemie GmbH)

In the table, the nonvolatile contents (NV) and the PWCs of pigment were calculated by the following formulae.

The nonvolatile contents (NV) were calculated from [(mass of coating film after drying)/(mass of coating composition before drying)]×100(%).

The PWCs of the scaly pigment were calculated from mass concentration (PWC) of scaly pigment=(total mass of scaly pigment)/[(total mass of resin solid content of coating film-forming resin and resin solid content of curing agent)+ (total mass of scaly pigment)]×100(%).

<Production Example of Coating Film>
An SPCC-SD steel sheet (dull steel sheet) treated with zinc phosphate and measuring 70 mm by 150 mm by 0.8 mm thick was subjected to electrodeposition coating with a cation electrodeposition coating 'Power Top U-50" produced by Nippon Paint Co., Ltd. so that a dry coating film thickness would be 20 μm. The resultant was baked at 160° C. for 30 minutes. Further, the coated sheet was further subjected to electrostatic deposition coating to have a dry film thickness of 35 μm with a gray intermediate coating "Olga P-30" (polyester melamine-based coating composition, produced by Nippon Paint Co., Ltd.), which had been diluted such that the viscosity thereof would be 25 seconds (measured at 20° C. using a No. 4 Ford cup). The resultant was baked at 140° C. for 30 minutes.

Then, the aqueous coating compositions of the respective Examples and Comparative Examples were applied with a Cartridge Bell (a rotary atomizing coater manufactured by ABB Industries) such that the dry film thicknesses shown in Table 1 would be achieved.

Then, following preheating at 80° C. for 3 minutes, a clear coating "MACFLOW O-1820 Clear" (epoxy curable acrylic resin-based coating composition, produced by Nippon Paint Co., Ltd.) was applied wet on wet with a rotary atomizing electrostatic coater such that a dry film thickness of 35 μm would be achieved. After the application, baking was carried out at 140° C. for 30 minutes, affording the multilayer coating films according to the respective Examples and Comparative Examples.

<Evaluation of Coating Films>
Physical properties of coating films obtained were evaluated based on the following criteria. The results are shown in Table 1.

(Settling Property)
An aqueous coating composition was placed in a 50 mL sample can and the state of settling attained after standing at room temperature for 10 days was evaluated based on the following criteria.
○: No pigment or the like has settled and no separation is observed at all.
Δ: A slight amount of pigment or the like has settled and the supernatant liquid is cloudy.
x: Pigment or the like has settled and the supernatant liquid has become transparent.

(Dispersion Stability)
250 mL of an aqueous coating composition obtained was placed in a 500 mL beaker, stirred at 30° C. for 7 days, and filtered through a 200 mesh filter, and then the degree of aggregation of pigment was evaluated.
○: Pigment has not aggregated.
x: Pigment has aggregated.

(Anti-sagging Property)
An aqueous coating composition obtained was applied to a coated plate with an electrodeposited coating film having a hole sized 5 mm in diameter using a Cartridge Bell (a rotary atomizing coater manufactured by ABB Industries) such that a dry film thicknesses shown in the following table would be achieved, followed by preheating at 80° C. for 3 minutes. Then, heating and curing was carried out at 140° C. for 30 minutes and a sagging length under the hole was measured. The smaller the numerical value, the better the anti-sagging property; a result with a length of 5 mm or less leads to an evaluation that the anti-sagging property is good (○), and a result with a length of more than 5 mm is led to an evaluation that the anti-sagging property was poor (x).

It should be noted that (Δ) means a case where the anti-sagging property was good in one measurement and the anti-sagging property was poor in another measurement even when the same coating composition was used.

(Hiding Property)
An aqueous coating composition obtained was applied to a black-and-white hiding test paper with a Cartridge Bell (a rotary atomizing coater manufactured by ABB Industries) such that a dry film thicknesses shown in the following table would be achieved, followed by preheating at 80° C. for 3 minutes. Then heating and curing was carried out at 140° C. for 30 minutes and the degree of hiding was visually evaluated.

A case where the base material has been hidden completely was rated as (○), and a case where the base material has shown through was rated as (x).

In addition, a hiding property of (⊚) means that further improved hiding property is exhibited.

In addition, the hiding property of (Δ) means that there occurred both a case where the hiding property was (○) and a case where the hiding property was (x) at a strictly limited site even when the same coating composition was used.

(Metallic Design)
An FI value (flip-flop property) and a G value (graininess) were measured by a "BYK-mac" (manufactured by BYK-Gardner) and used as the evaluation of a design-ability. The higher the flip-flop property and the denser the graininess, the better the metallic design is considered.

⊙: FI value is 25 or more and G value is 2.5 or less.
○: FI value is 20 or more and G value is 3.5 or less.
Δ: FI value is 15 or more and G value is 4 or less.
x: FI value is less than 15 or G value is 4 or more.

(Water-Resistant Adherability)

After immersing a specimen in water at 40° C. for 240 hours, the appearance of a coating film was visually observed and the adherability test described below was carried out. Evaluation criteria are as follows.

(High Temperature Water-Resistant Adherability)

After immersing a specimen in water at 80° C. for 120 hours, the appearance of a coating film was visually observed and the adherability test described below was carried out. Evaluation criteria are as follows.

(Adherability Test)

Ten slits were cuts at 1 mm pitches in a longitudinal direction and a lateral direction, respectively, on the coating film of a specimen with a cutter, and a cellophane tape$^{(registered\ trademark)}$ (produced by Nichiban Co., Ltd.) was affixed thereon and then peeled off, and the number of squares remaining out of 100 squares was counted (crosscut test). By this test, the presence or absence of delamination of the coating film was examined.

For example, when the result of the crosscut test is 0/100, this means that the peeled area of the coating film is 100%, indicating that the coating film has peeled off.

(Evaluation Criteria)

○: There is no coating film abnormality (no delamination of coating film, no occurrence of blister).

Δ: There is no occurrence of blister with a diameter of less than 1 mm and/or no delamination of the coating film in a part of the coating film.

x: There is occurrence of blister with a diameter of 1 mm or more and/or delamination of the coating film in a part of the coating film.

TABLE 1A

| | | Part by mass | Non-volatile content (%) | Example 1 Solid mass | Example 2 Solid mass | Example 3 Solid mass | Example 4 Solid mass | Example 5 Solid mass | Example 6 Solid mass | Example 7 Solid mass | Example 8 Solid mass | Example 9 Solid mass | Example 10 Solid mass | Example 11 Solid mass |
|---|---|---|---|---|---|---|---|---|---|---|---|---|---|---|
| Base coating composition | Coating film-forming resin | Acrylic emulsion | 256.0 | 20% | 47.2 | 47.2 | 47.2 | 47.2 | 47.2 | 47.2 | 47.2 | 47.2 | 47.2 | 47.2 | 47.2 |
| | Solvent | Dimethylethanol | 10.0 | 0% | 0.0 | 0.0 | 0.0 | 0.0 | 0.0 | 0.0 | 0.0 | 0.0 | 0.0 | 0.0 | 0.0 |
| | Coating film-forming resin | Water-soluble acrylic resin | 26.3 | 30% | 8.5 | 8.5 | 8.5 | 8.5 | 8.5 | 8.5 | 8.5 | 8.5 | 8.5 | 8.5 | 8.5 |
| | Coating film-forming resin | Prime Pole | 8.6 | 100% | 8.6 | 8.6 | 8.6 | 8.6 | 8.6 | 8.6 | 8.6 | 8.6 | 8.6 | 8.6 | 8.6 |
| | Curing agent | Cymel 204 | 27.1 | 100% | 27.1 | 27.1 | 27.1 | 27.1 | 27.1 | 27.1 | 27.1 | 27.1 | 27.1 | 27.1 | 27.1 |
| | Coating film-forming resin | NeoRez R | 26.0 | 33% | 8.6 | 8.6 | 8.6 | 8.6 | 8.6 | 8.6 | 8.6 | 8.6 | 8.6 | 8.6 | 8.6 |
| | Solvent | Lauryl acid phosphate | 0.2 | 0% | 0.0 | 0.0 | 0.0 | 0.0 | 0.0 | 0.0 | 0.0 | 0.0 | 0.0 | 0.0 | 0.0 |
| | Solvent | 2-Ethylhexanol | 60.0 | 0% | 0.0 | 0.0 | 0.0 | 0.0 | 0.0 | 0.0 | 0.0 | 0.0 | 0.0 | 0.0 | 0.0 |
| | Solvent | Ethylene glycol mono-2-ethylhexyl ether | 30.0 | 0% | 0.0 | 0.0 | 0.0 | 0.0 | 0.0 | 0.0 | 0.0 | 0.0 | 0.0 | 0.0 | 0.0 |
| Subtotal | Coating film-forming resin | | | | 72.9 | 72.9 | 72.9 | 72.9 | 72.9 | 72.9 | 72.9 | 72.9 | 72.9 | 72.9 | 72.9 |
| Subtotal | Curing agent | | | | 27.1 | 27.1 | 27.1 | 27.1 | 27.1 | 27.1 | 27.1 | 27.1 | 27.1 | 27.1 | 27.1 |
| Total | Main resin | WS-3001 | | | 100 20% | 100 20% | 100 20% | 100 20% | 100 20% | 100 20% | 100 20% | 100 20% | 100 20% | 100 20% | 100 35% |
| PWC (%) | Scaly pigment | Liquid Black FD-5090 | | | 5 | 7 | 3 | | | | | | 20% | 20% | |
| Pigment/(Main resin + Pigment) | Scaly pigment | | | | | | | | | | | | 5 | 5 | 4 |
| | Inorganic viscosity agent | LAPONITE RD | | | | | | 5 | | | | | | | |
| | Inorganic viscosity agent | LAPONITE EP | | | | | | | 5 | | | | | | |
| | Inorganic viscosity agent | OPTIGEL WX | | | | | | | | 3 | | | | | |
| | Hydrophobic associative viscosity agent | BYK-425 | | | 3 | 10 | 1 | 3 | 3 | | 3 | 3 | 3 | 3 | 3 |
| | Hydrophobic associative viscosity agent | BYK-420 | | | | | | | | | | | | | |
| | Dispersant | DISPERBYK-192 | | | 2.5 | 2.5 | 2.5 | 2.5 | 2.5 | 2.5 | 2.5 | 2.5 | 2.5 | 2.5 | 2.5 |
| | Dispersant | DISPERBYK-194N | | | 4 | 4 | 4 | 4 | 4 | 4 | 1 | 8 | 4 | | |
| | | Thickness (μm) | | | 5 | 7 | 3 | 5 | 5 | 5 | 5 | 5 | 5 | 5 | 4 |
| | | Added amount (parts by mass) of inorganic viscosity agent to 100 parts by mass of resin solid content of main resin | | | | | | | | | | | 2.5 | 2 2.5 | 2 4 |

TABLE 1A-continued

| Part | Non-volatile content (%) | Example 1 Solid mass | Example 2 Solid mass | Example 3 Solid mass | Example 4 Solid mass | Example 5 Solid mass | Example 6 Solid mass | Example 7 Solid mass | Example 8 Solid mass | Example 9 Solid mass | Example 10 Solid mass | Example 11 Solid mass |
|---|---|---|---|---|---|---|---|---|---|---|---|---|
| Added amount (parts by mass) of hydrophobic associative viscosity agent to 100 parts by mass of resin solid content of main resin | | 3 | 10 | 1 | 3 | 3 | 3 | 3 | 3 | 3 | 3 | 3 |
| Nonvolatile content (NV) (%) | | 10 | 7 | 13 | 10 | 10 | 10 | 10 | 10 | 10 | 10 | 10 |
| Mass concentration of scaly pigment (PWC) (%) | | 20 | 20 | 20 | 20 | 20 | 20 | 20 | 20 | 20 | 20 | 35 |
| Coating material property | Settling property | ○ | △ | ○ | ○ | ○ | ○ | ○ | ○ | ○ | ○ | ○ |
| | Dispersion stability | ○ | ○ | ○ | ○ | ○ | ○ | ○ | ○ | ○ | ○ | ○ |
| Coating workability | Antisagging property | ○ | ○ | ○ | ○ | ○ | ○ | ○ | ○ | ○ | ○ | ○ |
| | Hiding property | ○ | ○ | ○ | ○ | ○ | ○ | △ | ⊙ | ○ | ○ | ○ |
| Designability (Metallic tone) | Evaluation | ○ | ⊙ | △ | ○ | ○ | ○ | ⊙ | ⊙ | △ | △ | ○ |
| | FI | 23.2 | 28.4 | 17.6 | 21.5 | 20.8 | 21.8 | 25.5 | 20.3 | 19.3 | 21 | 24.2 |
| | G | 2.3 | 2.1 | 2.8 | 2.4 | 2.4 | 2.4 | 2.2 | 2.5 | 2.3 | 3.6 | 2.4 |
| Coating film performance | Water-resistant adherability (40° C.) | ○ | ○ | ○ | ○ | ○ | ○ | ○ | ○ | ○ | ○ | ○ |
| | High-temperature water-resistant adherability (80° C.) | ○ | ○ | ○ | △ | △ | △ | ○ | ○ | ○ | ○ | ○ |

TABLE 1 B

| | | Part by mass | Non-volatile content (%) | Comparative Example 1 Solid mass | Comparative Example 2 Solid mass | Comparative Example 3 Solid mass | Comparative Example 4 Solid mass | Comparative Example 5 Solid mass | Reference Example 1 Solid mass | Reference Example 2 Solid mass | Reference Example 3 Solid mass | Reference Example 4 Solid mass |
|---|---|---|---|---|---|---|---|---|---|---|---|---|
| Base coating composition | Coating film-forming resin | Acrylic emulsion | 235.0 | 20% | 47.2 | 47.2 | 47.2 | 47.2 | 47.2 | 47.2 | 47.2 | 47.2 | 47.2 |
| | Solvent | Dimethylethanol | 10.0 | 0% | 0.0 | 0.0 | 0.0 | 0.0 | 0.0 | 0.0 | 0.0 | 0.0 | 0.0 |
| | Coating film-forming resin | Water-soluble acrylic resin | 28.3 | 30% | 8.5 | 8.5 | 8.5 | 8.5 | 8.5 | 8.5 | 8.5 | 8.5 | 8.5 |
| | Coating film-forming resin | Prime Pole | 8.6 | 100% | 8.6 | 8.6 | 8.6 | 8.6 | 8.6 | 8.6 | 8.6 | 8.6 | 8.6 |
| | Curing agent | Cymel 204 | 27.1 | 100% | 27.1 | 27.1 | 27.1 | 27.1 | 27.1 | 27.1 | 27.1 | 27.1 | 27.1 |
| | Coating film-forming resin | NeoRez R | 26.0 | 33% | 8.6 | 8.6 | 8.6 | 8.6 | 8.6 | 8.6 | 8.6 | 8.6 | 8.6 |
| | Solvent | Lauryl acid phosphate | 0.2 | 0% | 0.0 | 0.0 | 0.0 | 0.0 | 0.0 | 0.0 | 0.0 | 0.0 | 0.0 |
| | Solvent | 2-Ethylhexanol | 60.0 | 0% | 0.0 | 0.0 | 0.0 | 0.0 | 0.0 | 0.0 | 0.0 | 0.0 | 0.0 |
| | Solvent | Ethylene glycol mono-2-ethylhexyl ether | 30.0 | 0% | | | | | | | | | |
| Subtotal | Coating film-forming resin | | | | 72.9 | 72.9 | 72.6 | 72.9 | 72.9 | 72.9 | 72.6 | 72.9 | 72.6 |
| Subtotal | Curing agent | | | | 27.1 | 27.1 | 27.1 | 27.1 | 27.1 | 27.1 | 27.1 | 27.1 | 27.1 |
| Total | | | | | 100 | 100 | 100 | 100 | 100 | 100 | 100 | 100 | 100 |
| PWC (%) Pigment/(Main resin + Pigment) | | | | | 20% | 20% | 20% | 20% | 20% | 20% | 20% | 3% | 20% |
| | Main resin | WS-2001 | | | 8 | 0 | 5 | 5 | 5 | 7 | 1 | 5 | 5 |
| | Scaly pigment | Liquid Black | | | 1.5 | 10 | 20 | | | 15 | 1 | | |
| | Scaly pigment | FD-5090 | | | | | | | 3 | | | 3 | 3 |
| | Inorganic viscosity agent | LAPONITE RD | | | 2.5 | 2.5 | 2.5 | 2.5 | 0 | 2.5 | 2.5 | 2.5 | 2.5 |
| | Inorganic viscosity agent | LAPONITE EP | | | 4 | 4 | 4 | 4 | 4 | Not coatable | 8 | 4 | 15 |
| | Inorganic viscosity agent | OPTIGEL WX | | | 8 | 0 | 5 | 5 | 5 | 7 | 1 | 5 | 5 |
| | Hydrophobic associative viscosity agent | BYK-425 | | | 1.5 | 10 | 20 | | 3 | 15 | 1 | 3 | 3 |
| | Hydrophobic associative viscosity agent | BYK-420 | | | | | | | | | | | |
| | Dispersant | DISPERBYK-192 | | | 10 | 10 | 10 | 10 | 10 | 2 | 20 | 10 | 10 |
| | Dispersant | DISPERBYK-194N | | | 20 | 20 | 20 | 20 | 20 | 20 | 20 | 3 | 20 |
| | Thickness (μm) | | | | | | | | | | | | |
| | Added amount (parts by mass) of inorganic viscosity agent to 100 parts by mass of resin solid content of main resin | | | | | | | | | | | | |
| | Added amount (parts by mass) of hydrophobic associative viscosity agent to 100 parts by mass of resin solid content of main resin | | | | | | | | | | | | |
| | Nonvolatile content (NV) (%) | | | | | | | | | | | | |
| | Mass concentration of scaly pigment (PWC) (%) | | | | | | | | | | | | |
| Coating material property | Settling property | | | | ○ | X | ○ | X | ○ | X | ○ | ○ | ○ |
| | Dispersion stability | | | | ○ | ○ | ○ | ○ | X | X | ○ | ○ | ○ |
| Coating | Antisagging property | | | | ○ | △ | ○ | △ | ○ | X | ○ | ○ | ○ |

TABLE 1 B-continued

| Part by mass | | Comparative Example 1 Solid mass | Comparative Example 2 Solid mass | Comparative Example 3 Solid mass | Comparative Example 4 Solid mass | Comparative Example 5 Solid mass | Reference Example 1 Solid mass | Reference Example 2 Solid mass | Reference Example 3 Solid mass | Reference Example 4 Solid mass |
|---|---|---|---|---|---|---|---|---|---|---|
| | Non-volatile content (%) | | | | | | | | | |
| workability | Hiding property Evaluation | ○ | ○ | ○ | ○ | ○ | — | ⊙ | X | ⊙ |
| Designability (Metallic tone) | FI | 23.5 | 20.2 | 24.2 | 21.4 | 23.3 | — | X | X | X |
| | G | 2.3 | 2.5 | 2.3 | 2.4 | 2.3 | — | 9.5 | 14.2 | 14.6 |
| Coating film performance | Water-resistant adherability (40° C.) | ○ | ○ | ○ | ○ | ○ | — | 3.8 | 2.5 | 2.6 |
| | High-temperature water-resistant adherability (80° C.) | X | ○ | ○ | ○ | ○ | — | ○ | ○ | ○ |
| | | | | | | | | ○ | ○ | ○ |

The aqueous coating composition of the present invention has superior coating film physical properties such as superior coating film strength. Further, the aqueous coating composition of the present invention is an aqueous coating composition having a low NV, and the aqueous coating composition of the present invention does not cause poor orientation of the pigment and does not cause settling of the pigment. Therefore it can form a metallic coating film that has superior coating film appearance and does not exhibit graininess (glare). Moreover, it has superior water resistance.

Further, if the method for forming a metallic coating film of the present invention is used, a coating film obtained has superior coating film physical properties such as coating film strength and chipping resistance.

Furthermore, if the method for forming a metallic coating film of the present invention is used, it is possible to form a coating film without causing poor orientation of the pigment and without causing settling of the pigment even though an aqueous coating composition having a low NV is used. Thereby, it is possible to form a metallic coating film that has superior coating film appearance and exhibits no graininess (glare).

By contrast, in Comparative Example 1, the amount of the inorganic viscosity agent is outside the range of the present invention. Due to this feature, it is shown that a coating film obtained is remarkably inferior in high temperature water-resistant adherability.

Comparative Example 2 is directed to a coating composition not containing the inorganic viscosity agent according to the present invention. Due to this feature, the settling property of the coating composition markedly deteriorates and the coating film appearance tends to be uneven. In addition, it is shown that the anti-sagging property of the coating composition is somewhat inferior.

In Comparative Example 3, the amount of the hydrophobic associative viscosity agent is outside the range of the present invention. Due to this feature, the dispersion stability of the coating composition deteriorates and the scaly pigment may aggregate.

Comparative Example 4 is a coating composition not containing the hydrophobic associative viscosity agent according to the present invention. Due to this feature, the settling property of the coating composition markedly deteriorates and the coating film appearance tends to be uneven. In addition, the coating film clouds and it will be impossible to attain good metallic luster. In addition, it is shown that the anti-sagging property of the coating composition is somewhat inferior.

Comparative Example 5 is directed to a coating composition not containing a dispersant according to the present invention. Due to this feature, the dispersion stability of the coating composition deteriorates and the scaly pigment may aggregate.

As described above, the aqueous coating composition using only an inorganic viscosity agent results in reduced water resistance of a coating film, whereas use of only a hydrophobic associative viscosity agent leads to generation of cloud in a coating film, which makes it impossible to obtain good metallic luster. If these viscosity agents are used in an amount smaller or larger than the above ranges, the above-mentioned remarkable effects cannot be obtained.

INDUSTRIAL APPLICABILITY

The aqueous coating composition according to the present invention has a coating film appearance and coating film physical properties required for an article to be coated. Furthermore, the aqueous coating composition according to the present invention can have low NV although it is an aqueous coating composition. In addition, the method for forming a metallic coating film according to the present invention can be applied to general industrial applications as described above.

The invention claimed is:

1. An aqueous coating composition comprising a coating film-forming resin, a curing agent, a scaly pigment, an inorganic viscosity agent, a hydrophobic associative viscosity agent, and a dispersant, wherein
    the composition contains the inorganic viscosity agent in an amount of 2 to 5 parts by mass based on 100 parts by mass of the total resin solid content of the coating film-forming resin and the curing agent,
    the inorganic viscosity agent is at least one selected from the group consisting of natural hectorite, synthetic hectorite, natural bentonite and synthetic bentonite,
    the composition contains the hydrophobic associative viscosity agent in an amount of 1 to 15 parts by mass based on 100 parts by mass of the total resin solid content of the coating film-forming resin and the curing agent,
    the hydrophobic associative viscosity agent is a urethane-based hydrophobic associative viscosity agent,
    at least one of the film-forming resin, the curing agent, the scaly pigment, the inorganic viscosity agent, and the dispersant has at least one hydrophobic group, and
    the composition has a nonvolatile content (NV) of 3% to 10%.

2. The aqueous coating composition according to claim 1, wherein when the mass concentration (PWC) of the scaly pigment in the aqueous coating composition satisfies the following formula:

PWC=(the total mass of the scaly pigment)/[(the total mass of the resin solid content of the coating film-forming resin and the resin solid content of the curing agent)+(the total mass of the scaly pigment)]×100(%), the range of the PWC is 5% to 35%.

3. The aqueous coating composition according to claim 1, wherein the scaly pigment comprises a scaly pigment having an aspect ratio of 10 to 2000.

4. The aqueous coating composition according to claim 1, wherein the coating film-forming resin comprises at least one resin selected from the group consisting of an acrylic-based resin, a urethane-based resin, and a polyester-based resin.

5. The aqueous coating composition according to claim 1, wherein the scaly pigment comprises a pigment selected from the group consisting of a metal flake, a metal oxide flake, a vapor-deposited metal pigment, a pearl pigment, and mixtures thereof.

6. The aqueous coating composition according to claim 1, wherein the scaly pigment comprises a pigment selected from the group consisting of an aluminum pigment, a chromium pigment, an alumina pigment, a chromium oxide pigment, and mixtures thereof.

7. The aqueous coating composition according to claim 1, wherein the scaly pigment comprises a pigment selected from the group consisting of a vapor-deposited aluminum pigment, a vapor-deposited chromium pigment, a vapor-deposited alumina pigment, a vapor-deposited chromium oxide pigment, and mixtures thereof.

8. The aqueous coating composition according to claim 1, wherein the inorganic viscosity agent is a layered silicate.

9. The aqueous coating composition according to claim 1, wherein the dispersant is a polymer type dispersant having at least one group selected from the group consisting of an anionic group, a cationic group, and a nonionic group.

10. A method for forming a metallic coating film, comprising:
- a step (1) of applying an aqueous coating composition onto an article to be coated to form an uncured coating film,
- a step (2) of applying a clear coating composition onto the uncured coating film to form an uncured clear coating film, and
- a step (3) of heating and curing the uncured coating film obtained in the step (1) and heating and curing the uncured clear coating film obtained in the step (2) at a time to form a multilayer coating film, wherein
the aqueous coating composition is the aqueous coating composition according to claim 1, and wherein
the formed multilayer coating film has a thickness of 1 to 8 μm,
to form the metallic coating film.

11. A method for forming a metallic coating film, comprising:
- a step of applying an aqueous intermediate coating composition onto an article to be coated to form an uncured intermediate coating film,
- a step (1) of applying an aqueous coating composition onto the uncured intermediate coating film to form an uncured coating film,
- a step (2) of applying a clear coating composition onto the uncured coating film to form an uncured clear coating film, and
- a step (3) of heating and curing the uncured intermediate coating film and the uncured coating film obtained in the step (1), and the uncured clear coating film obtained in the step (2) at a time to form a multilayer coating film, wherein
the aqueous coating composition is the aqueous coating composition according to claim 1, and wherein
the formed multilayer coating film has a thickness of 1 to 8 μm,
to form the metallic coating film.

\* \* \* \* \*